United States Patent [19]
Emori et al.

[11] Patent Number: 5,152,359
[45] Date of Patent: Oct. 6, 1992

[54] REACTION PRESSURE CONTROL MECHANISM OF POWER STEERING APPARATUS

[75] Inventors: Yasuyoshi Emori; Yukimitsu Minamibata, both of Saitama, Japan

[73] Assignee: Jidosha Kiki Co., Ltd., Tokyo, Japan

[21] Appl. No.: 671,346

[22] Filed: Mar. 19, 1991

[30] Foreign Application Priority Data

Mar. 23, 1990 [JP] Japan .................. 2-30274[U]

[51] Int. Cl.$^5$ .............................................. B62D 5/06
[52] U.S. Cl. ...................................... 180/142; 180/132
[58] Field of Search ............... 180/141, 142, 143, 132

[56] References Cited

U.S. PATENT DOCUMENTS

| | | | |
|---|---|---|---|
| 3,744,515 | 7/1973 | Inoue | 180/143 X |
| 4,216,841 | 9/1980 | Ohtuka et al. | 180/141 |
| 4,616,728 | 10/1986 | Suzuki et al. | 180/142 |
| 4,637,484 | 1/1987 | Ijiri et al. | 180/142 |
| 4,784,235 | 11/1988 | Ijiri et al. | 180/142 |

Primary Examiner—Charles A. Marmor
Assistant Examiner—Kevin Hurley
Attorney, Agent, or Firm—Flynn, Thiel, Boutell & Tanis

[57] ABSTRACT

A reaction pressure control mechanism of power steering apparatus includes a power cylinder, to which a pressure oil discharged from an oil pump is supplied through a control valve, and oil discharged from the oil pump is branched to be introduced into a hydraulic reaction chamber, which produces steering reaction. A pair of variable restrictions are formed in a supply and discharge passage to and from the hydraulic reaction chamber, and a single spool which is operated by a solenoid is effective to increase the opening of one of the variable restrictions while reducing the opening of the other restriction. A plunger is disposed in opposing relationship with a rod associated with the solenoid and on which the spool is fixedly mounted so that when the oil pressure in the reaction chamber exceeds a given value, such oil pressure is introduced to the backside of the plunger to cause the spool to be driven back, thus reducing the opening of the variable restriction associated with the supply passage.

12 Claims, 3 Drawing Sheets

REACTION PRESSURE CONTROL MECHANISM OF POWER STEERING APPARATUS

BACKGROUND OF THE INVENTION

The invention relates to a power steering apparatus, in particular, to a reaction pressure controller which controls an oil pressure acting upon a hydraulic reaction mechanism thereof.

In a power steering apparatus which is responsive to vehicle speed, as disclosed in Japanese Laid-Open Patent Application No. 103,765/1988, a control valve is operated in accordance with an input applied to a steering wheel, to introduce a pressure oil into one of chambers in a power cylinder in order to apply a steering assisting force to steerable road wheels. In order to allow a driver of the vehicle to sense the resistance to a steering operation, there are provided a hydraulic reaction mechanism in which a steering reaction is generated by causing a pressure oil to act upon the hydraulic reaction chamber and a reaction pressure control valve mechanism which controls the pressure introduced into the hydraulic reaction chamber.

A reaction pressure control valve mechanism is known in the art which controls a reaction pressure by means of a solenoid operated valve. Information such as a vehicle speed, a steering angle or the number of revolutions of an engine are input to a controller in order to control a displacement of the solenoid operated valve. In this instance, there must be provided some sort of sensor in order to derive such information, causing an increase in the manufacturing cost. In another variety, the solenoid valve is controlled in accordance with a vehicle speed alone to simplify the construction.

In an arrangement as described above in which the solenoid operated valve is controlled in accordance with the vehicle speed alone, there will be achieved a response which provideds a sharp steering sensation in a high load range (or a range of larger steering angles) covering from a medium to a high speed where an input torque is high, since then the relationship between the input torque and the cylinder pressure of the power steering apparatus will be relatively close to a linear one (see FIG. 5a). On the other hand, where a rapid steering operation is required, there is some times the likelihood that the steering operation may be retarded because of an increased loading upon the steering wheel. Hence, there is a drawback that such approach is not adapted to be incorporated into automobiles of advanced classes. This is due to the fact that the opening of the solenoid operated valve which is determined by the vehicle speed does not change for an equal vehicle speed regardless of loading upon the power steering apparatus, so that the reaction pressure increases with an increase in the cylinder pressure of the power steering apparatus (see FIG. 5b).

SUMMARY OF THE INVENTION

Therefore, it is an object of the invention to provide a power steering apparatus including a reaction pressure control mechanism which reduces a reaction pressure under a high loading for a range of speed from a medium to a high speed while allowing a sensibly light steering sensation to be obtained.

The above object is accomplished in accordance with the invention by providing a pair of variable restrictions in a spool valve which is connected to the rod of solenoid operated valve and which moves back and forth, and an oil pressure obtained between the both variable restrictions is introduced into a hydraulic reaction chamber. One of the variable restrictions is located between the reaction chamber and an oil pump while the other variable constriction is located between the reaction chamber and a tank. In response to a movement of the spool valve which is cause by the advancing rod, the area of opening of the variable restriction which is located nearer the oil pump is increased while the area of opening of the other variable restriction is reduced. Conversely, as the rod retracts, the areas of the openings change in the opposite direction. A plunger is disposed in opposing relationship with the rod of the solenoid to which the spool valve is connected, and a spring is disposed behind the plunger or nearer the solenoid to urge the plunger away from the rod. Either the oil pressure which provails in the reaction chamber or an input pressure of the steering apparatus or both are introduced into a liquid chamber disposed behind the plunger. When the oil pressure in the liquid chamber becomes equal to or exceeds a given value, the plunger operates to push the spool valve back, thus reducing the variable restriction located between the oil pump and the reaction chamber.

DESCRIPTION OF EMBODIMENTS

Figure 1:
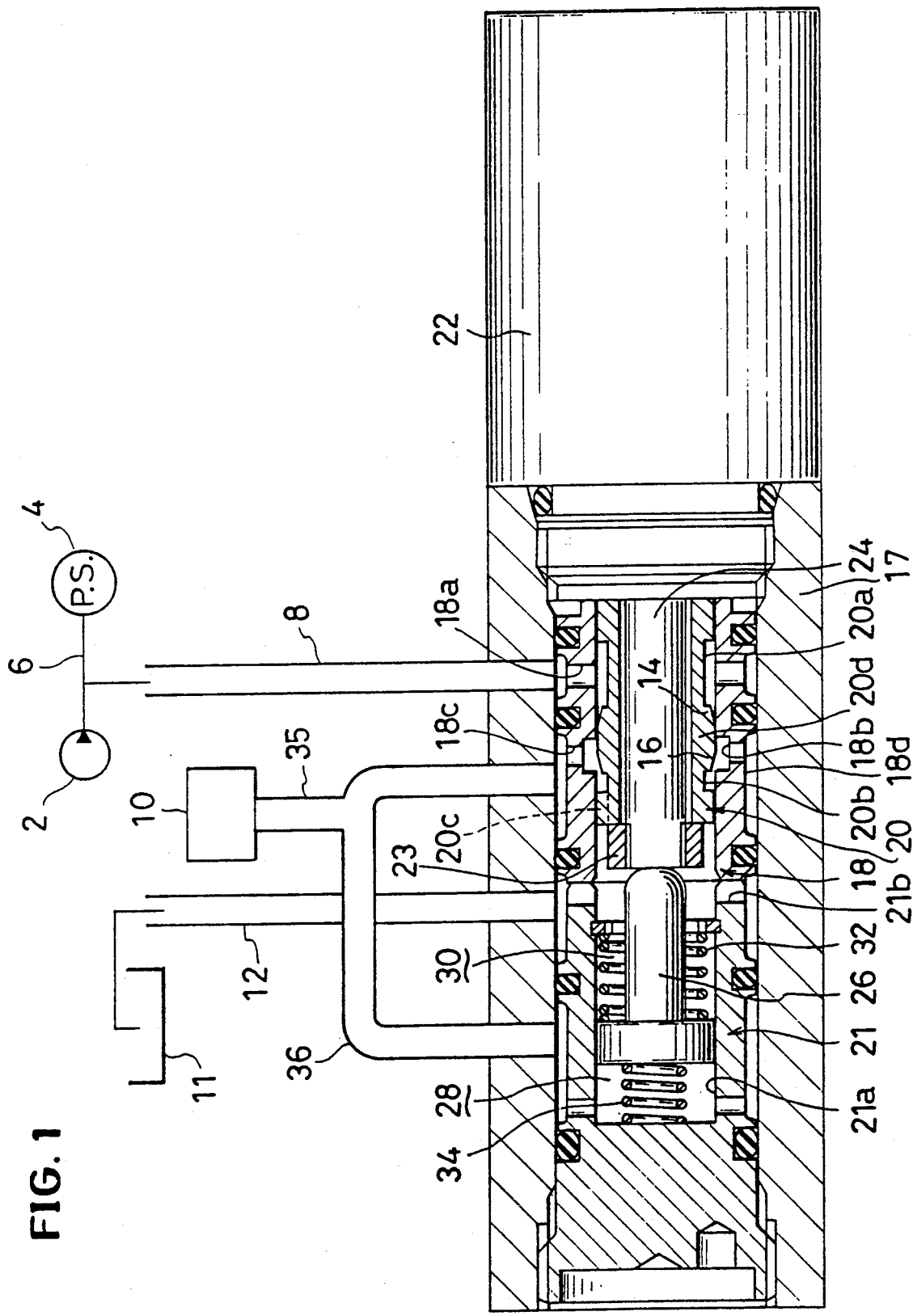
FIG. 1 is a longitudinal section of reaction pressure control mechanism of a power steering apparatus according to one embodiment of the invention.

Referring to the drawings, several embodiments of the invention will now be described. FIG. 1 is a schematic view, mainly in section, of an essential part of a reaction pressure control mechanism of a power steerings apparatus (P.S.). according to on embodiment of the invention. An oil pump 2 feeds a pressure oil to a power steering apparatus 4, and includes a discharge piping 6 connected to a supply passage 8. A pressure oil from the passage 8 passes through a pair of variable restrictions 14 and 16 and through a discharge passage 12 to return to a tank 11 when these restrictions are not closed as a spool valve 20, to be described later, has moved to the left of their position shown in FIG. 1. An oil pressure obtained intermediate the pair of variable restrictions 14 and 16 is introduced into hydraylic reaction chamber 10, and a reaction pressure which prevails in the reaction chamber 10 is controlled by changing the area of openings of the variable restrictions 14 and 16.

The pair of variable restrictions 14 and 16 are defined between a spool valve 20 slidably disposed inside a sleeve 18 which is fitted into a housing 17 an annular groove 18b formed in the inner surface of the sleeve 18. A pair of annular grooves 20a and 20b are formed in the outer surface of the spool valve 20. One of the annular grooves, 20a, which is shown located on the right side, is maintained in communication with the oil pump 2 through a through-opening 18a formed in the sleeve 18 while the other annular groove 20b, shown as located on the left side, is maintained in communication with the tank 11 through a slit 20c formed in the spool valve 20 and a radial oil path 21b formed in a plug 21 which will be described later. A land 20d is defined between the pair of annular grooves 20a and 20b, and is formed with tapered constrictions on its opposite sides. The variable restrictions 14 and 16 are formed by the combination of the tapered constrictions and the opposite square corners of the annular groove 18b formed in the inner surface of the sleeve 18. The annular groove 18b formed in the sleeve 18 communicates with the hydraulic reaction chamber 10 through a through-opening 18c, an annular groove 18d formed in the outer surface of the sleeve 18 and an introduction opening 35 to the rection chamber.

The spool valve 20 is fitted over a rod 24 associated with an solenoid which is fixedly mounted in the housing 17, and is secured thereto by a nut 23. The valve 20 moves back and forth in accordance with the movement of the rod 24. A current flow which energizes the solenoil 22 is controlled by a controller, to which a detection signal is fed from a vehicle speed sensor, not shown, thus controlling the displacement of the spool valve 22 in either forward or reverse direction. The construction of the solenoid 22 is well known in the art, and therefore will not be described in detail herein, except to note that an internal spring returns the rod 24 to a home position when the solenoid is not energized.

A plug 21 having an internal circular bore 21a is fitted into the housing 17 at the opposite end thereof from the solenoid 22. A Plunger 26 is slidably received within the circular bore 21a in the plug 21, and its free end is disposed in opposing relationship with the rod 24 associated with the solenoid 22. The plunger 26 divides the inside of the plug 21 into a pair of liquid chambers 28 and 30, and a resilient member or spring 32 is disposed in the liquid chamber 30 which is located nearer the solenoid 22, thus urging the plunger 26 away from the rod 24. A spring 34 is disposed within the other liquid chamber 28 for positioning the plunger 26. An oil pressure of the same magnitude as the oil pressure prevailing in the reation chamber 10 is introduced into the liquid chamber 28 through a connection piping 36 which branches from the introduction opening 35.

The operation of the above arrangement will now be described. The magniude of a current which is used to energize the solenoid 22 is designed to be high when the vehicle is running at a low speed, and decreases with an increase in the vehicle speed. When turning a steering wheel while the vehicle is at rest, the spool valve 20 will move to its rightmost position as shown in FIG. 1, and the variable restriction 14 associated with the supply passage 8 will be completely closed while the variable restriction 16 associated with the discharge passage 12 will exhibit a maximum opening area. Accordingly, there is no pressure oil which is introcuced into the reaction chamber 10, and the oil pressure in the reaction chamber 10 will remain substantially at zero to produce no reaction torque if the pressure of the power steering apparatus 4 rises.

As the vehicle speed increases, the current which is used to energize the solenoid 22 decreases, and the spool valve 20 begins to be displaced to the left, as viewed in FIG. 1, from its position which is assumed when the vehicle speed is at rest, thus increasing the area of opening of the variable restriction 14 associated with the supply passage 18 and reducing the area of the opening of the variable restriction 16 associated with the discharge passage 12. Accordingly, the pressure ratio (the reaction pressure/PS pressure) of the pressure oil which is introduced into the reaction chamber 10 increases, and the oil pressure which prevails in the reaction chamber 10 will rise in accordance with the pressure ratio to produce the reaction torque as the steering wheel is operated to increase the pressure of the power steering apparatus 4.

Figure 2A:
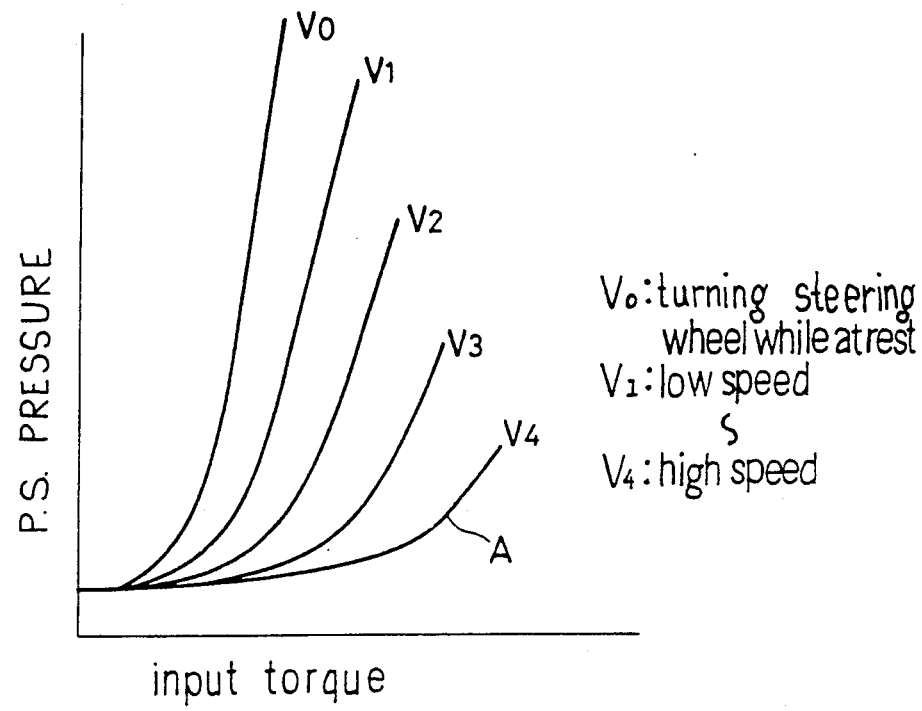
FIGS. 2a and b are schematic diagrams illustrating the response of the apparatus.
Figure 2B:
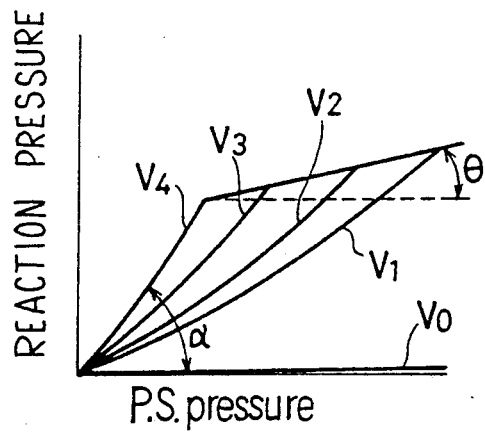

When the reaction pressure increases to reach a given value, the oil pressure which is introduced into the liquid chamber 28 causes the plunger 26 to be moved to the right against the resilience of the spring 32, causing the rod 24 associated with the solenoid 22 to be driven back, thus reducing the variable restruction 14 associated with the supply passage 8 and increasing the variable restriction 16 associated with the discharge passage 12. As a consequence, the ratio of the reaction pressure with respect to the pressure of the power steering apparatus 4 decreases, suppressing and increase in the steering torque. Since the rod 24 associated with the solenoid 22 will be located at a position under a low speed condition which is shifted to the right of the position assumed under a high speed condition, when the free end of the plunger 26 bears against the rod 24, the spring 32 disposed within the liquid chamber 30 experiences an increased flexure, whereby a greater reaction pressure will be require under a low speed condition than under a high speed condition in order to enable the plunger 26 to push back the rod under the influence of the reaction pressure which is introduced into the liquid chamber 28. As a result, there are obtained responses as shown in FIGS. 2a and b. In particular, it is possible to suppress an increase in the magnitude of the reaction pressure under a high speed condition, beginning from a relatively low level of reaction pressure.

Figure 3:
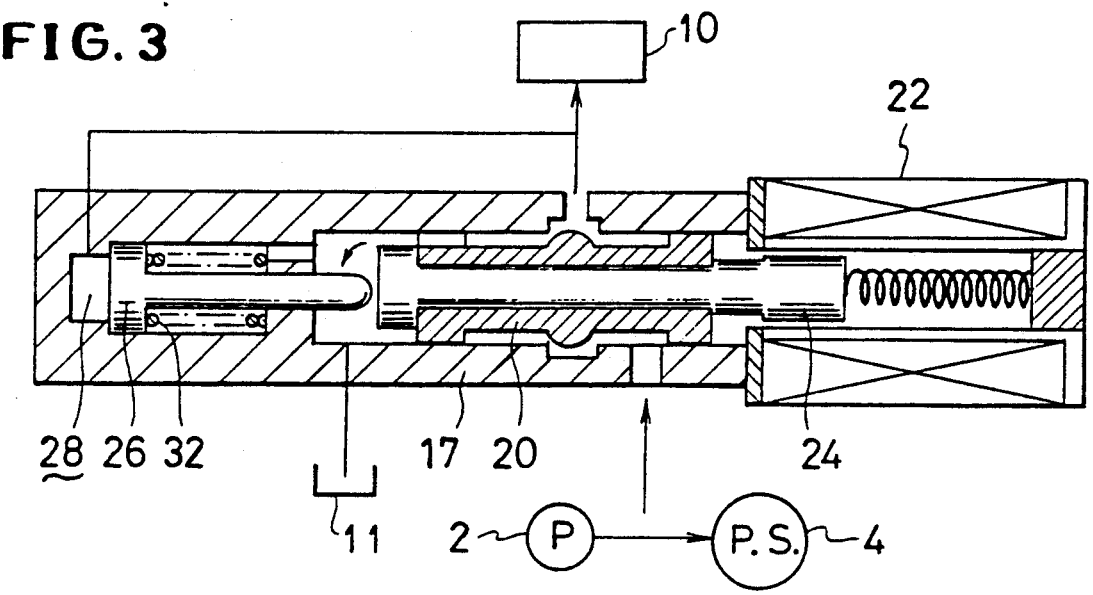
FIGS. 3 and 4 are longitudinal sections of other embodiments.

FIG. 3 shows a second embodiment where the spring 34 which was disposed within the liquid chamber 28 on the backside of the plunger 26 in the first embodiment is removed. In other respects, the arrangement is similar to the one mentioned above, and similar numerals are used to denote corresponding parts for avoiding a repeated description. As before, an increase in the reaction pressure above a given value can be suppressed.

Figure 4:
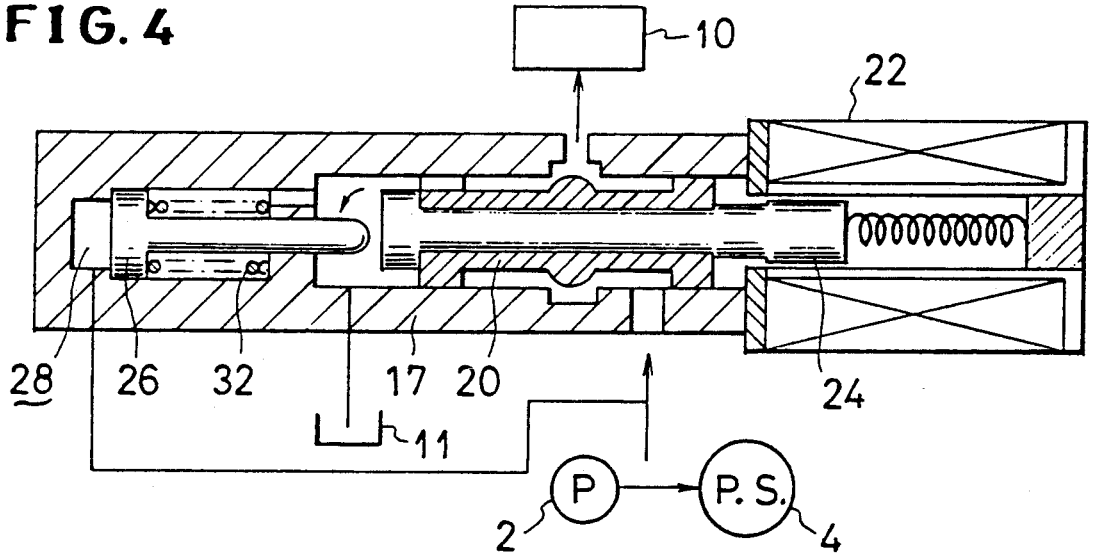
Figure 5B:
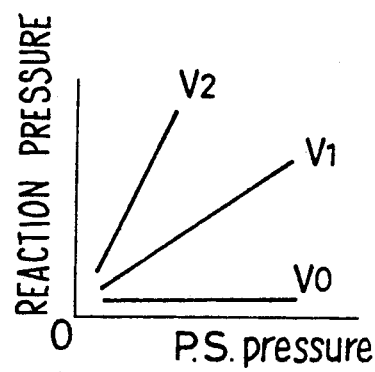
FIGS. 5a and b are schematic diagrams illustrating the responses of a conventional apparatus.
Figure 5A:
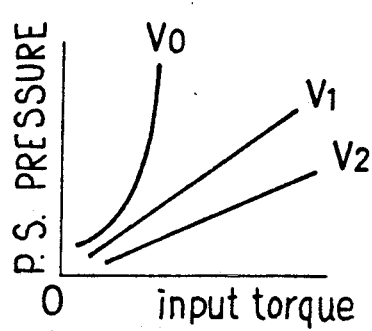

FIG. 4 shows a third embodiment in which an inlet pressure of the power steering apparatus 4, rather than the oil pressure prevailing in the reaction chamber 10, is introduced into the liquid chamber 28 which is located on the backside of the plunger 26. It is also possible to suppress an increase in the reaction pressure in this embodiment.

While the sleeve 18 is fitted into the housing 17 in the first embodiment, the spol valve may be directly fitted into the housing as shown in other embodiments. It should be understood that curves A depicting the input torque and the rates of increase, $\theta$ and $\alpha$, in the reaction pressure as a function of the pressure of the power steering apparatus 4 for intermediate to high speeds of the vehicle, $V_1$ to $V_4$, are not limited to be examples shown, but may be established as desired.

While the invention has been described above in connection with the several embodiments thereof, it should be understood that number of changes, substitutions and modifications therein will readily occur to one skilled in the art from the above disclosure without departing from the spirit and scope of the above invention defined by the appended claims.

What is claimed is:

1. Reaction pressure control mechanism of power steering apparatus in which a pressure oil discharged from an oil pump is supplied to a power cylinder through a control valve, and the oil discharged from the oil pump is also branched to be introduced into a hydraulic reaction chamber to produce a steering reaction;

characterized by a spool valve slidably disposed within a housing and connected to a rod of a solenoid-fixedly mounted within the housing for movement therewith;

a pair of variable restrictions formed in the spool valve in a manner such that the area of opening of the one of the restrictions increases while the area of openings of the other restriction decreases, the pair of variable restrictions being arranged such that as the rod moves forward, one of the variable restrictions which is disposed between a supply passage extending from the pump and an inlet opening to the hydraulic reaction chamber has its opening increased while the other variable restriction disposed between an introduction opening to the reaction chamber and a discharge passage has its opening reduced;

and a combination of a liquid chamber, a plunger and a resilient member disposed in opposing relationship with the free end of the rod and in axial alignment with the rod, an inlet pressure of the power steering apparatus and a pressure which prevails in the hydraulic reaction chamber being introduced into the liquid chamber to assist in the action of the solenoid in displacing the rod.

2. Reaction pressure control mechanism of power steering apparatus according to claim 1 in which the plunger is disposed in opposing relationship with the free end of the rod and in axial alignment with the rod, a spring being disposed on the side of the plunger which is nearer the solenoid while the liquid chamber is disposed on the other side thereof, an oil pressure which prevails in the hydraulic reaction chamber and an inlet pressure of the power steering apparatus being introduced into the liquid chamber.

3. Reaction pressure control mechanism of power steering apparatus according to claim 2 in which the pair of variable restrictions comprise an annular groove formed in the internal surface of a sleeve, the spool valve being slidably fitted into the sleeve and having a land formed thereon, and a pair of tapered constrictions formed on the opposite ends of the land.

4. Reaction pressure control mechanism of power steering apparatus according to claim 3 in which the spool valve is fitted over and secured to the rod associated with the solenoid.

5. Reaction pressure control mechanism of power steering apparatus according to claim 4 in which the solenoid is operative to control the displacement of the spool valve in accordance with the vehicle speed.

6. Reaction pressure control mechanism of power steering apparatus according to claim 2 in which a separate spring is disposed in the liquid chamber in which the oil pressure is introduced for positioning the plunger.

7. Reaction pressure control mechanism of power steering apparatus in which a pressure oil discharged from an oil pump is supplied to a power cylinder through a control valve, and the oil discharged from the oil pump is also branched to be introduced into a hydraulic reaction chamber to produce a steering reaction;

characterized by a spool valve slidably disposed within a housing and connected to a rod of a solenoid fixedly mounted within the housing for movement therewith;

a pair of variable restrictions formed in the spool valve in a manner such that the area of opening of the one of the restrictions increases while the area of opening of the other restriction decreases, the pair of variable restrictions being arranged such that as the rod moves forward, one of the variable restrictions which is disposed between a supply passage extending from the pump and an inlet opening to the hydraulic reaction chamber has its opening increased while the other variable restriction disposed between an introduction opening to the reaction chamber and a discharge passage has its opening reduced;

and a combination of a liquid chamber, a plunger and a resilient member disposed in opposing relationship with the free end of the rod and in axial alignment with the rod, a pressure which prevails in the hydraulic reaction chamber being introduced into the liquid chamber to assist in the action of the solenoid in displacing the rod.

8. Reaction pressure control mechanism of power steering apparatus according to claim 7 in which the plunger is disposed in opposing relationship with the free end of the rod and in axial alignment with the rod, a spring being disposed on the side of the plunger which is nearer the solenoid while the liquid chamber is disposed on the other side thereof, an inlet pressure of the power steering apparatus being introduced into the liquid chamber.

9. Reaction pressure control mechanism of power steering apparatus according to claim 8 in which the pair of variable restrictions comprise an annular groove formed in the internal surface of a sleeve, the spool valve being slidably fitted into the sleeve and having a land formed thereon, and a pair of tapered constrictions formed on the opposite ends of the land.

10. Reaction pressure control mechanism of power steering apparatus according to claim 9 in which the spool valve is fitted over and secured to the rod associated with the solenoid.

11. Reaction pressure control mechanism of power steering apparatus according to claim 10 in which the solenoid is operative to control the displacement of the spool valve in accordance with a vehicle speed.

12. Reaction pressure control mechanism of power steering apparatus according to claim 8 in which a separate spring is disposed in the liquid chamber in which the oil pressure is introduced for positioning the plunger.

* * * * *